(12) United States Patent
Kauffman et al.

(10) Patent No.: US 7,234,911 B2
(45) Date of Patent: Jun. 26, 2007

(54) METHOD AND MACHINE FOR SEPARATING PROFILED ELEMENTS

(75) Inventors: Nathan Kauffman, York, PA (US);
Stacy Lemkelde, York, PA (US);
Jan-Peter Groeneweg, Hoogeveen (NL)

(73) Assignee: KRB Machinery Co., Wrightsville, PA (US)

( * ) Notice: Subject to any disclaimer, the term of this patent is extended or adjusted under 35 U.S.C. 154(b) by 226 days.

(21) Appl. No.: 10/999,262

(22) Filed: Nov. 30, 2004

(65) Prior Publication Data

US 2006/0113164 A1 Jun. 1, 2006

(51) Int. Cl.
*B66C 1/00* (2006.01)

(52) U.S. Cl. ............................ 414/745.7; 414/746.4; 414/745.9; 414/800

(58) Field of Classification Search ............... 414/731, 414/745.1, 745.9, 746.1, 746.4, 746.7, 746.8, 414/800; 198/470.1
See application file for complete search history.

(56) References Cited

U.S. PATENT DOCUMENTS

| | | | |
|---|---|---|---|
| 3,214,001 A | 10/1965 | Callaghan | |
| 3,694,021 A | 9/1972 | Mullen | |
| 3,774,779 A | 11/1973 | White | |
| 3,931,896 A | 1/1976 | Novis | |
| 3,979,018 A * | 9/1976 | Modiano | 221/10 |
| 4,362,460 A | 12/1982 | Peddinghaus | |
| 4,573,860 A | 3/1986 | Peddinghaus | |
| 4,732,066 A | 3/1988 | Del Fabro et al. | |
| 5,163,804 A | 11/1992 | Kobayashi | |
| 5,238,353 A * | 8/1993 | Kollross et al. | 414/746.4 |
| 5,641,263 A | 6/1997 | Ogrinc et al. | |
| 6,260,902 B1 | 7/2001 | Synnelius | |
| 6,503,046 B1 | 1/2003 | Saiki et al. | |
| 6,554,559 B1 * | 4/2003 | Borg et al. | 414/746.1 |

FOREIGN PATENT DOCUMENTS

| | | | | |
|---|---|---|---|---|
| GB | 2370828 A | | 7/2002 | |
| JP | 53125667 A | * | 11/1978 | 414/745.1 |
| JP | 111314879 A | | 11/1999 | |
| JP | 2001020535 A | | 1/2001 | |

* cited by examiner

*Primary Examiner*—Mark A. Deuble
(74) *Attorney, Agent, or Firm*—McNees Wallace & Nurick LLC

(57) ABSTRACT

A method and machine separates profiled elements from a plurality of profiled elements. The machine includes a structure having opposed first and second ends and opposed sides, the structure receiving profiled elements extending between the first and second ends. A first separating device more evenly distributes the profiled elements between the sides. A displacement member displaces a portion of the profiled elements away from the remainder of the profiled elements. A gripper receives the portion of the separated profiled elements, the gripper moving the separated profiled elements toward one of the sides. A second separating device disposed adjacent the first end between the portion of the separated profiled elements and the remainder of the profiled elements travels from the first end toward the second end for separating the separated profiled elements from the remainder of the profiled elements, directing the separated profiled element to one side of the structure.

17 Claims, 21 Drawing Sheets

METHOD AND MACHINE FOR SEPARATING PROFILED ELEMENTS

FIELD OF THE INVENTION

The present invention is directed to a method and machine for use with profiled elements, and more particularly, is directed to a method and machine for separating profiled elements.

BACKGROUND OF THE INVENTION

Profiled elements, such as steel rods, can be used in numerous applications, e.g., to reinforce concrete. Typically, profiled elements are fabricated in extended lengths, such as up to about 72 feet, bundled and shipped to a processing location. Upon arrival at the processing location, the profiled elements are formed and cut to the desired shape and length and provided to the final destination, such as a construction project.

The profiled element processor is typically able to process a single profiled element or a small number of profiled elements in an operation. In order to process the profiled element(s), they must be separated from the bundle of profiled elements. Unfortunately, the profiled elements within the bundle can become tangled, similar to spaghetti, making it difficult to extract a single profiled element or a small number of profiled elements. Typically, the separation of the profiled elements from the bundle is performed using manual labor that is time-consuming, physically exhausting to perform. A worker grasps one end of a profiled element and applies a sudden lateral movement in one direction, followed by a similarly sudden lateral movement in the other direction. This opposing set of lateral movements produces a whipping effect that helps loosen and separate the grasped profiled element from the other profiled elements. In addition to being physically exhausting, this set of movements is responsible for a classification of medical injuries known as repetitive motion injuries. Finally, it is common for workers to receive lacerations or contusions from the profiled elements, especially after the worker loses his grip on the profiled element during the lateral movements.

Profiled elements in the United States are sized and identified by the diameter of the profiled element, typically being measured in one eighth inch increments. For example, a #3 bar profiled element, or #3 bar, is three eighths of an inch in diameter, a #4 bar is one half an inch in diameter and a #5 bar is five eighths of an inch in diameter. Alternately, profiled elements can be referred to by their diameter in millimeters. Although the size of profiled elements commonly used can range from #3 bar to #18 bar, #4 bar and #5 bar sizes account for approximately one half of the profiled elements used in industry.

It has been found that as the diameter of the profiled element decreases, the amount of tangling between the profiled elements as bundled increases. Thus, many fabricators choose to use shorter bundle lengths of smaller diameter profiled elements (e.g., #3 and #4 bar profiled elements), such as 40 foot lengths, instead of longer bundle lengths, such as 60 foot lengths. While reducing bundle lengths decreases profile element tangling, material handling increases, since a greater number of profiled elements are required.

One solution to this problem, U.S. Pat. No. 6,503,046 issued to Saiki et al. is directed to an apparatus for extracting a single bar from a plurality of bars, the apparatus including a holding device for nipping the single bar. The holding device descends upon the plurality of bars on a receiving table to nip the single bar, which is then separated from the rest of the plurality of bars. However, due to the limited maximum payload per operation cycle, a single bar, the apparatus of Saiki is inefficient and time-consuming.

What is needed is a method and machine for selectably separating multiple profiled elements from a bundle of profiled elements, to minimize time associated with processing of profiled elements.

SUMMARY OF THE INVENTION

The present invention relates to a machine for separating at least one profiled element from a plurality of profiled elements. The machine includes a structure having a first end, a second end opposite the first end and a first side opposite a second side, the structure being configured to receive a plurality of profiled elements extending between the first and second ends. A first separating device is associated with the structure, the first separating device being configured to distribute the plurality of profiled elements between the first and second sides. A displacement member displaces a portion of at least one profiled element of the plurality of profiled elements away from a remainder of the plurality of profiled elements, the displaced portion of the at least one profiled element of the plurality of profiled elements being adjacent the first end. A gripper is disposed adjacent the first end and configured to securely receive the displaced portion of the at least one profiled element of the plurality of profiled elements, the gripper being configured to move the displaced portion of the at least one profiled element of the plurality of profiled elements toward one of the first and second sides. A second separating device is disposed adjacent the first end between the displaced portion of the at least one profiled element of the plurality of profiled elements and the remainder of the plurality of profiled elements, the second separating device traveling from the first end toward the second end to separate the at least one profiled element of the plurality of profiled elements from the remainder of the plurality of profiled elements and directing the at least one profiled element of the plurality of profiled elements to one of the first side and the second side of the structure.

The present invention further relates to a method for separating at least one profiled element from a plurality of profiled elements. The steps of the method include providing a structure having a first end, a second end opposite the first end and a first side opposite the second side, the structure being configured to receive a plurality of profiled elements extending between the first and second ends; distributing the plurality of profiled elements between the first and second sides; displacing a portion of at least one profiled element of the plurality of profiled elements away from a remainder of the plurality of profiled elements, the displaced portion of the at least one profiled element of the plurality of profiled elements being adjacent the first end; securing the displaced portion of the at least one profiled elements of the plurality of profiled elements, moving the portion of the at least one profiled elements of the plurality of profiled elements toward one of the first and second side; and separating the at least one profiled element of the plurality of profiled elements from the remainder of the plurality of profiled elements by a second separating device disposed adjacent the first end between the at least one profiled element of the plurality of profiled elements and the remainder of the plurality of profiled elements, the second separating device traveling from the first end toward the second end to separate the at least one profiled element of the plurality of profiled elements from the remainder of the plurality of profiled elements by directing the at least one profiled element of the plurality of profiled elements to one of the first side and the second side of the structure.

The present invention still further relates to a machine for separating at least one profiled element from a plurality of profiled elements. The machine includes a structure having a first end, a second end opposite the first end and a first side opposite the second side, the structure being configured to receive a plurality of profiled elements extending between the first and second ends. A first separating device is associated with the structure, the first separating device configured to distribute the plurality of profiled elements between the first and second sides. An actuating member raises one end of at least one profiled element of the plurality of profiled elements above a remainder of the plurality of profiled elements, the raised end of the at least one profiled element of the plurality of profiled elements being adjacent the first end. A gripper is disposed adjacent the first end and configured to securely receive the raised end of the at least one profiled element of the plurality of profiled elements, the gripper pivoting the raised end of the at least one profiled element toward one of the first and second side. A second separating device is disposed adjacent the first end between the raised end of the at least one profiled element and the remainder of the plurality of profiled elements, the second separating device traveling from the first end toward the second end to separate the at least one profiled element of the plurality of profiled elements from the remainder of the plurality of profiled elements and directing the at least one profiled element of the plurality of profiled elements to one of the first side and the second side of the structure.

An advantage of the present invention is that it minimizes time associated with processing profiled elements.

A further advantage of the present invention is that it can be automated.

Another advantage of the present invention is that the gripper construction can be less complicated.

Still another advantage of the present invention is that a predetermined number of profiled elements can be selected by the gripper.

Yet another advantage of the present invention is that the bundle of profiled elements is partially separated prior to operation of the gripper.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
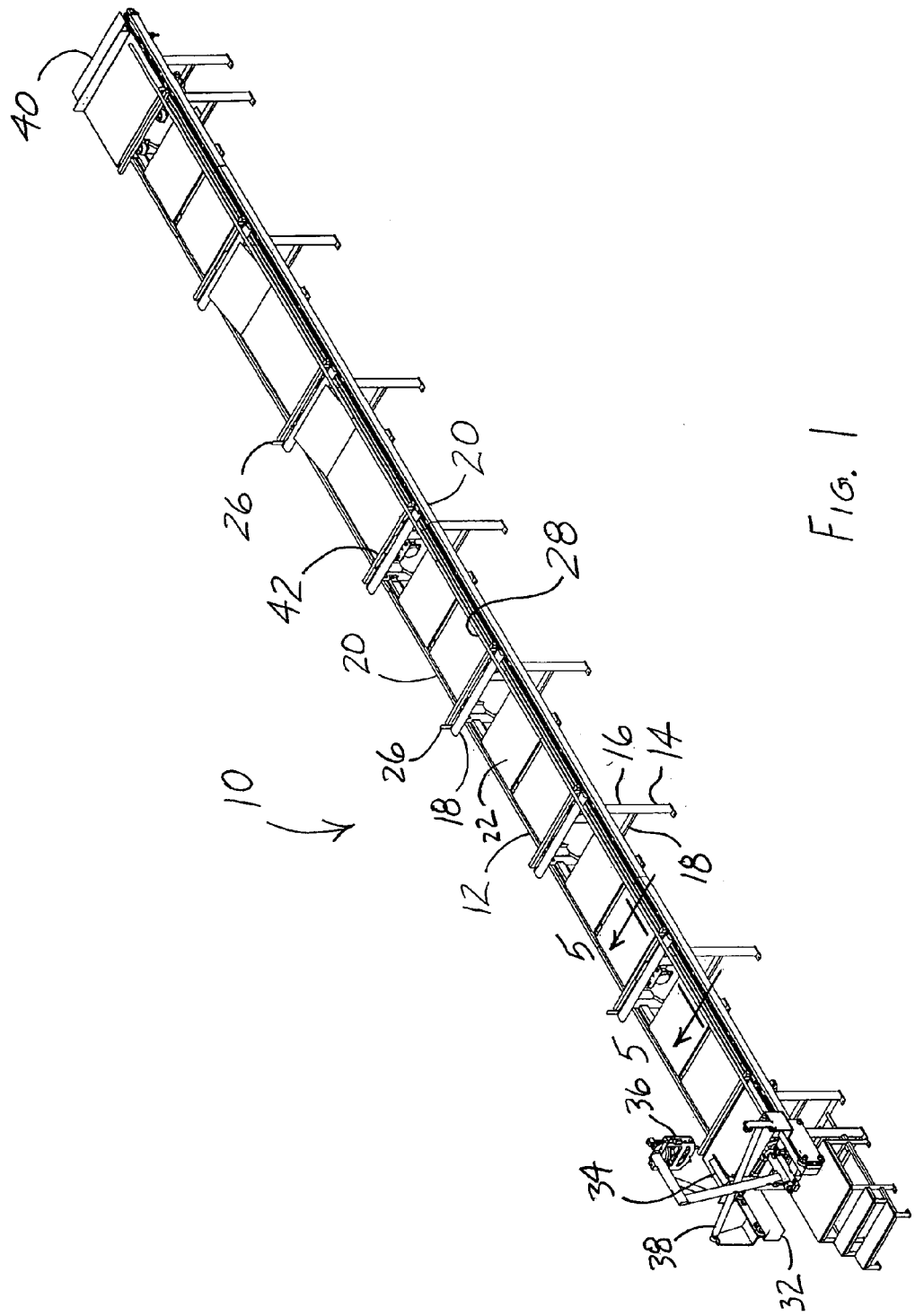
FIG. 1 is an overall perspective view of a profiled element separating machine of the present invention.
Figure 2:
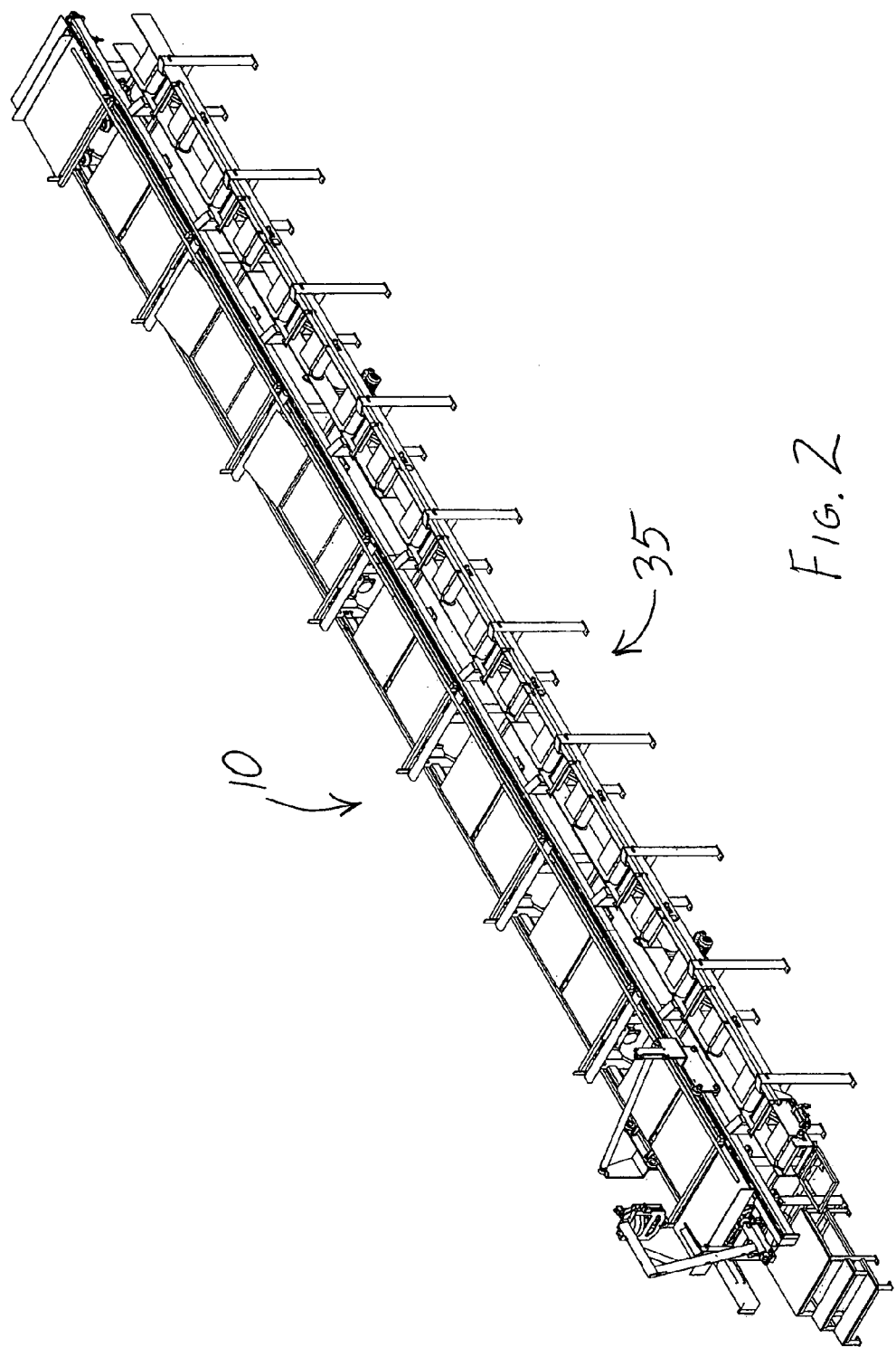
FIG. 2 is an overall perspective view of the profiled element separating machine and a chute of the present invention.
Figure 3:
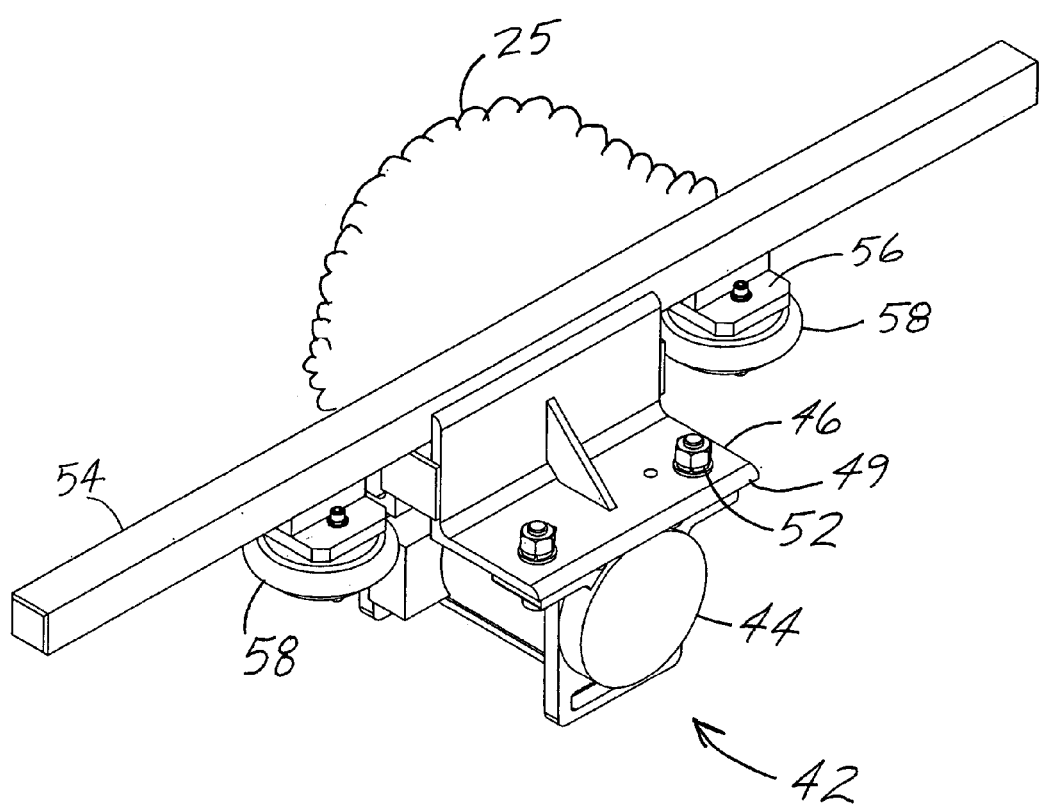
FIG. 3 is a perspective view of a separator of the present invention prior to distributing a bundle of profiled elements.
Figure 4:
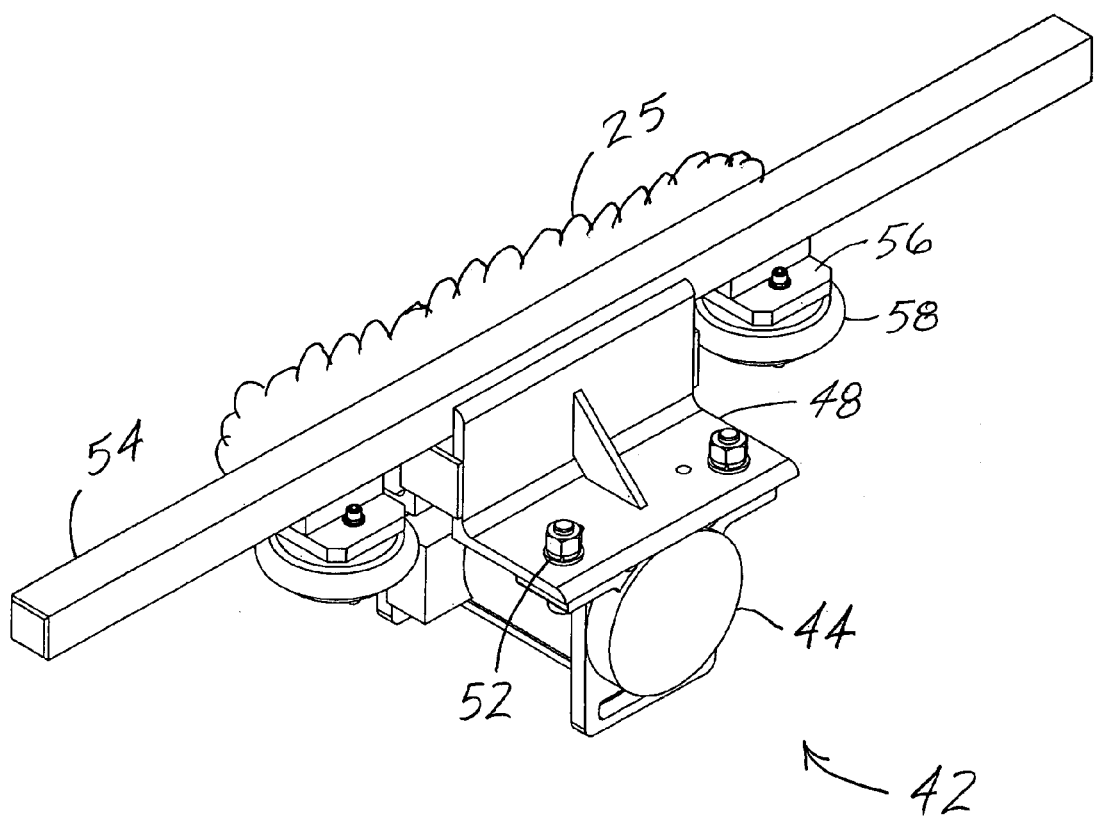
FIG. 4 is a perspective view of the separator of the present invention after distributing the bundle of profiled elements.
Figure 5:
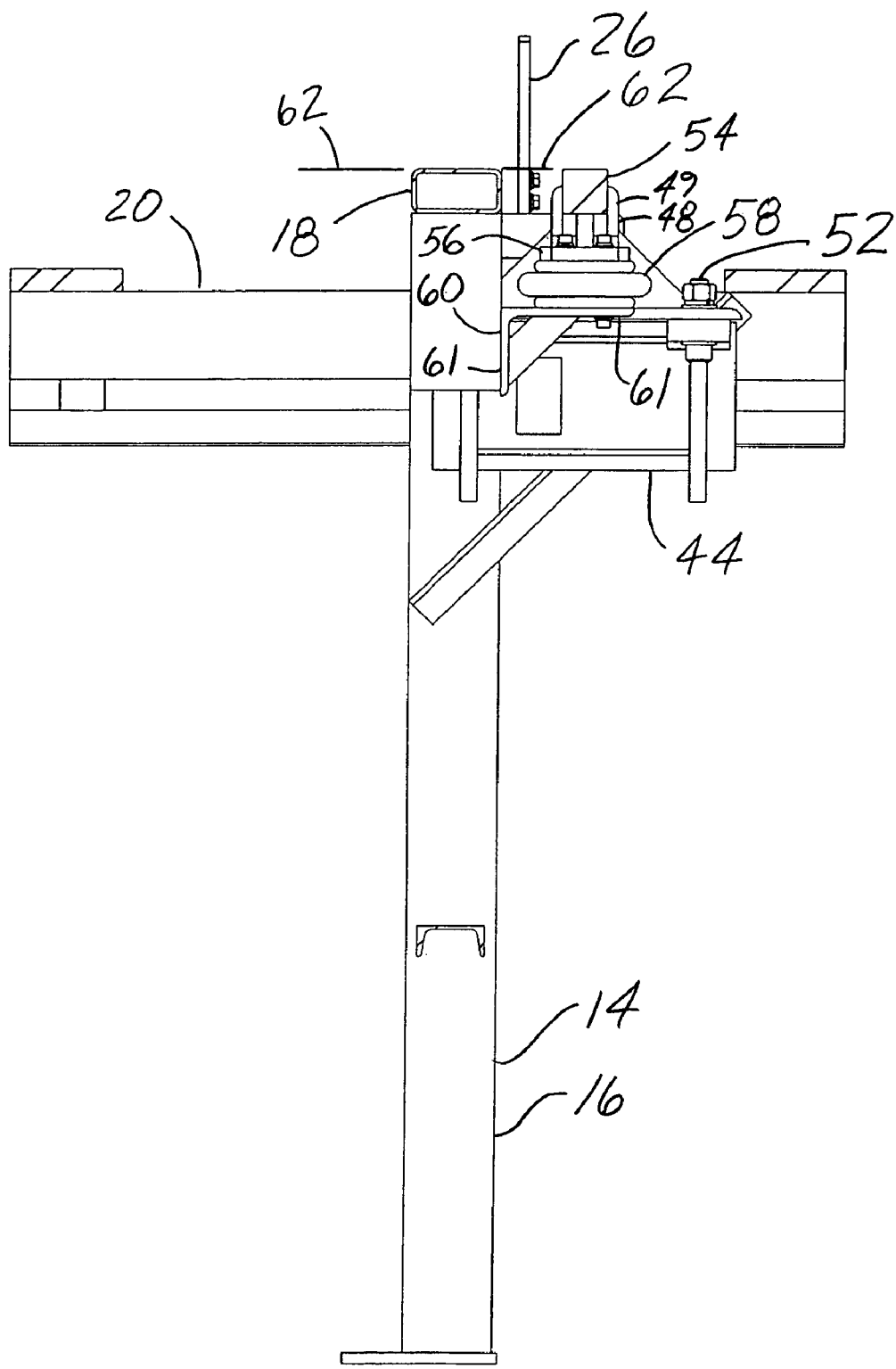
FIG. 5 is an elevation view of the separator in its deflated condition taken along line 5—5 of FIG. 1 of the present invention.
Figure 6:
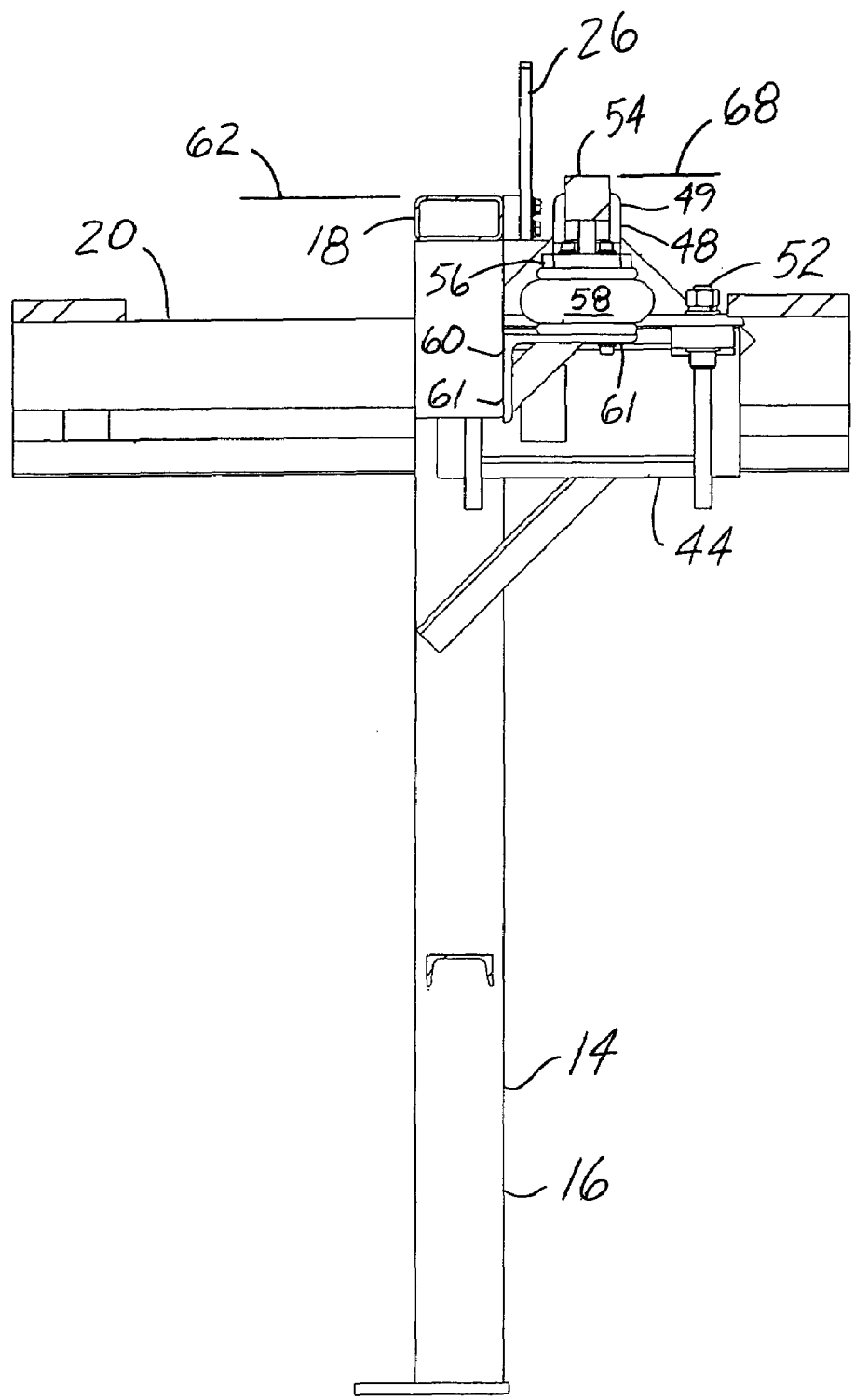
FIG. 6 is an elevation view of the separator in its inflated condition taken along line 5—5 of FIG. 1 of the present invention.
Figure 7:
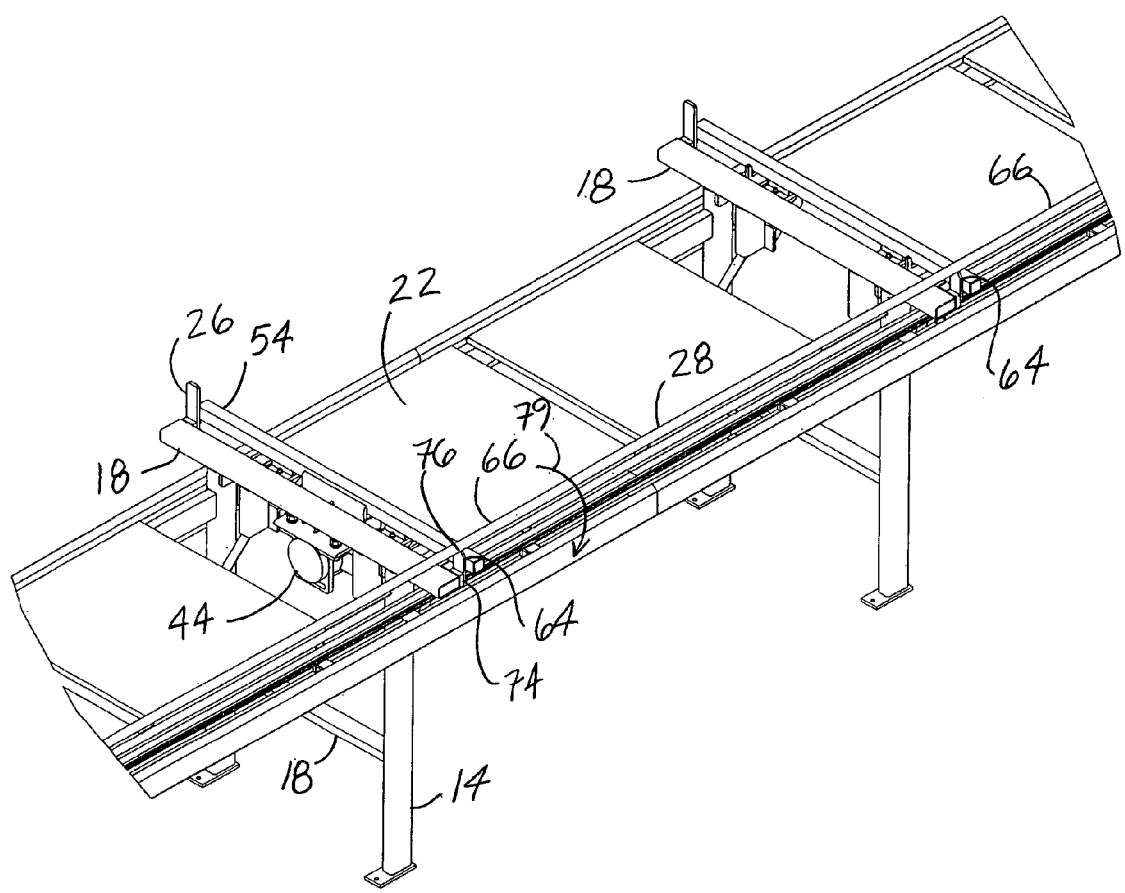
FIG. 7 is a perspective view of a movable retainer of the present invention.

One embodiment of a profiled element separating machine 10 of the present invention is depicted in FIG. 1. Machine 10 includes a structure 12 comprised of a plurality of in-line frames 14, each frame 14 preferably having a pair of vertical members 16 supporting a pair of interposed horizontal members 18 that form a box frame. A horizontal beam 20 which spans substantially the entire length of the machine 10 is connected to vertical members 16 near opposed upper corners of each frame 14, providing support and stability to the structure 12, as well as providing a guide for each end of a separating device 38. Panels 22 are interposed between the pair of beams 20 to further provide structural support. Preferably, adjacent to alternating upper horizontal members 18 is a separator 42 which more evenly distributes a plurality of profiled elements 25, such as the members included in a shipped bundle of profiled elements, that are deposited onto structure 12. Once the separator 42 has been operated, a displacement member 34 adjacent an end 32 of the machine 10 actuates to displace, or separate, a portion, preferably the ends, of a number of profiled elements 125 from the plurality of profiled elements 25. A gripper 36 adjacent displacement member 34 receives a portion of the separated profiled elements 125 preferably adjacent the ends of the separated profiled elements 125, the gripper 36 moving the portion of the separated profiled elements 125 to one side of the structure 12, such as the side adjacent the movable retainer 28. Separating device 38 is then directed to move along the beams 20 from end 32 toward an opposite end 40 to separate the profiled elements 125 from the remainder of profiled elements 25. As the separating device 38 is directed toward the end 40, the separated profiled elements 125 are directed to the one side of the structure 12, preferably for collection by an adjacent chute 35 (FIG. 2) for subsequent processing.

Referring to FIGS. 2–7, separator 42 preferably includes a transverse member 54 that extends outwardly past the vertical members 16 of one frame 14. Preferably, a pair of support bases 56 extends from the transverse member 54, each support base 56 being adjacent to one of the vertical members 16. An angle 60 or similarly configured structure has a pair of legs 61, one leg 61 of angle 60 being secured to one vertical member 16 and the other leg 61 provided to support one end of the separator 42. An air pillow 58 is interposed between support base 56 and secured to one leg 61 of the angle 60 to vibrationally isolate separator 42 from the remainder of the structure 12. An eccentric motor 44 that can be powered by pressurized fluid, electricity or other energy source produces vibrational energy when in operation. Connecting structure 46, which secures the eccentric motor 44 to the transverse member 54, can include an opposed pair of angles 48 having legs 49 which are affixed to opposite sides of the transverse member 54. The angles 48 can be secured to the eccentric motor 44 by fasteners 52, such as bolts, screws, clamps or other known construction, or secured by adhesive, welding or other known bonding technique. Once the plurality, typically a bundle, of profiled elements 25 is placed on the structure 12 (FIG. 3), the separator 42 is configured to transmit vibrational energy from the eccentric motor 44 through the transverse member 54 to the profiled elements 25, more evenly distributing the profiled elements along the transverse member 54 (FIG. 4) to facilitate separation of the profiled elements. In another embodiment, multiple separators 42 can be used to more effectively accomplish this task.

Typically, the eccentric motor 44 of the separator 42 is only operated for a relatively brief period of time after the profiled elements 25 have been placed on the structure 12, i.e., until the profiled elements are more evenly distributed along the transverse members 54. When the separator 42 is not in use, preferably the top surface of the transverse member 54 is disposed substantially parallel or even slightly below the level of the top surface of the adjacent horizontal member 18 which is fixed at a frame height 62 (see FIG. 5). That is, when the separator 42 is not in use, the air pillows 58 of the separator 42 are sufficiently deflated so that the air pillows 58 do not support the weight of the profiled elements 125 (see FIG. 5). However, when the separator 42 is operated, preferably, the air pillows 58 are sufficiently inflated from a source of pressurized air (not shown) so that the top surface of the transverse member 54 is disposed at an elevated separating height 68 that is above the level of the frame height 62 corresponding to the top surface of the adjacent horizontal member 18 (see FIG. 6). In other words, when the separator 42 is operating as intended, the air pillows 58 are sufficiently inflated so that the transverse member 54 supports the weight of the profiled elements 25.

Figure 21:
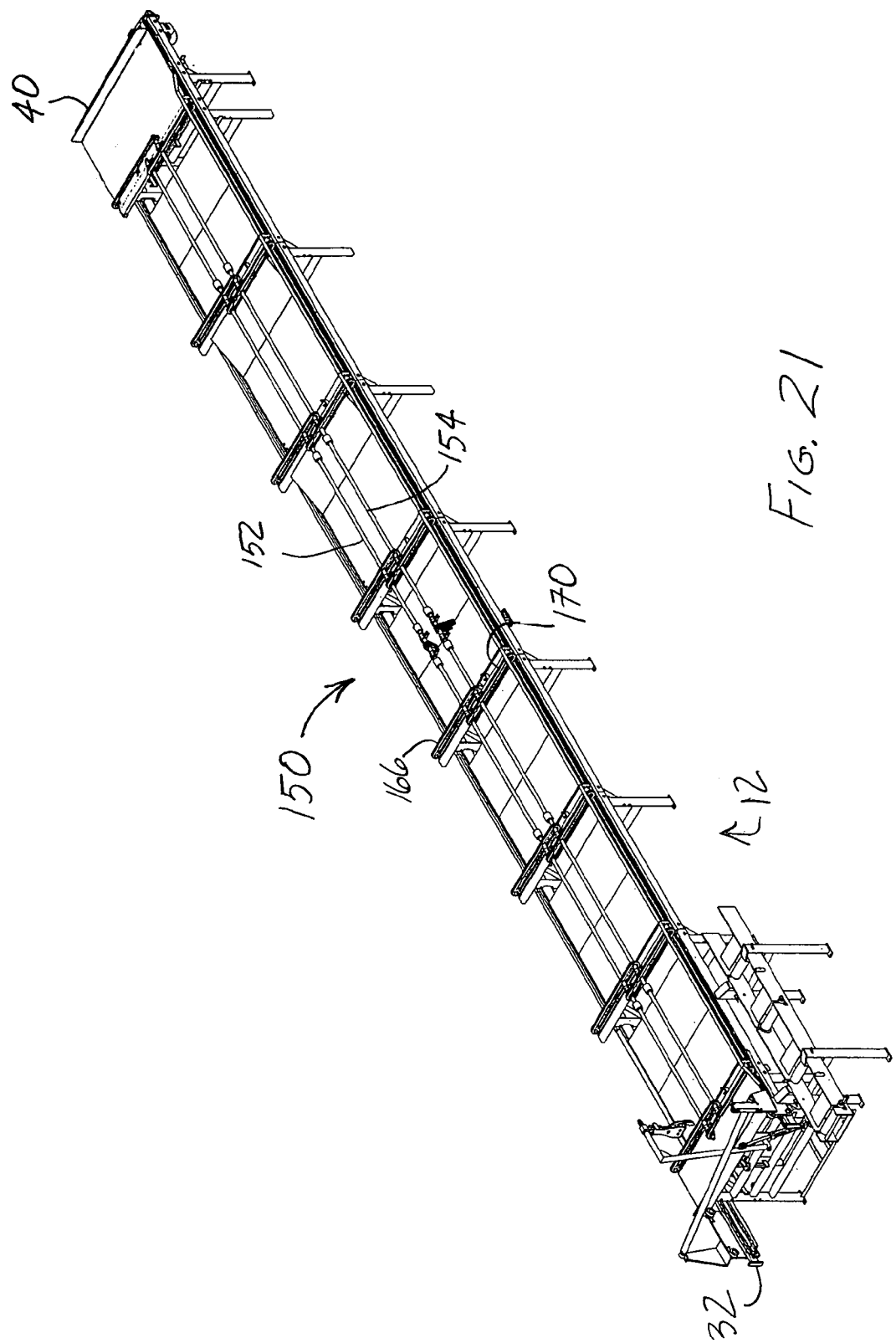
FIGS. 21–22 is a perspective view of an alternate embodiment of a separator of the present invention prior to distributing a bundle of profiled elements.
Figure 22:
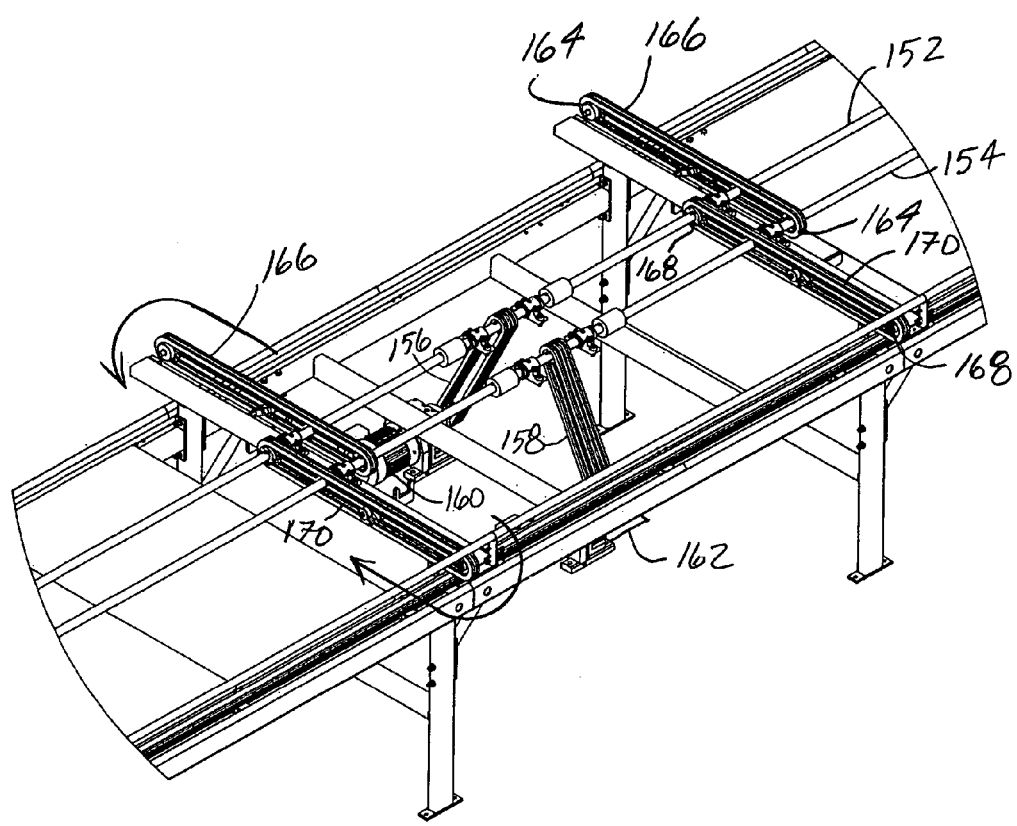

Referring to FIGS. 21–22 an alternate separating device 150 is shown. The separating device 150 includes a pair of interconnected rods 152, 154 that substantially extend the length of the structure 12 from the end 32 to the end 40. A drive belt 156 is operatively connected between the rod 152 and a motor 160 to drive the rod 152 into rotational movement. Similarly, a drive belt 158 is operatively connected between the rod 154 and a motor 162 to drive the rod 154 into rotational movement. A gear 168 is secured to both the rod 152 and to the structure 12 to rotatably support a chain 170 or belt therebetween. Also a gear 164 is secured to both the rod 154 and to the structure 12 to rotatably support a chain 166 or belt therebetween. Preferably, a number of sets of chains 166, 170 are provided along the structure 12. The chains 166, 170 are driven in opposed rotational directions by respective motors 162, 160 to more evenly distribute profiled elements between the retainers 26, 28 that are supported on the structure 12.

Alternately, the separating device 150 can be used to evacuate the structure 12. This feature is especially useful when only a partial bundle of profiled elements is required. For example, if only 100 profiled elements are required out of a bundle of 250 profiled elements of 4 bar profiled elements, 150 profiled elements would then remain on the structure 12. By directing the chains 166, 170 to rotate in the same direction, the remaining profiled elements can be moved to one side of the structure 12 for easy removal or evacuation from the structure 12 for subsequent rebundling and returning the profiled elements to storage. In an additional alternate arrangement where the profiled elements can be removed by an overhead crane, it may be desirable to consolidate the profiled elements on the structure 12. This can be accomplished by directing the chains 166, 170 to rotate in opposite directions to consolidate the profiled elements along the centerline of the structure 12. Stated another way, the profiled elements are manipulated toward the centerline of the structure 12 to less evenly distribute profiled elements between the retainers 26, 28 that are supported on the structure 12.

To prevent profiled elements 25 from inadvertently falling from the structure 12, the horizontal member 18 has a retainer 26 affixed to one end and a movable retainer 28 pivotally secured to the other end to ease loading of profiled elements 25 onto the structure 12. The movable retainer 28 includes an arm 64 that is hingedly connected at an end 74 to an end of the horizontal member 18 opposite the retainer 26, the arm 64 being connected at its other end 76 to a rail 66. Preferably, when the rail 66 in a raised position above the horizontal member 18, upon application of a force away from the structure 12, the rail 66 rotates about the ends 74 of the arms 64 in a rotational 79 to actuate the rail 66 toward a lowered position. Similarly, when the rail 66 is in a lowered position below horizontal member 18, upon application of a force to produce an opposed rotational movement 81 that is opposite rotational direction 79, the rail 66 rotates about the ends 74 of the arms 64 to actuate the rail 66 to its raised position. Alternately, a motor or other device known in the art can be employed to provide the desired rotational movement of the rail 66.

Figure 8:
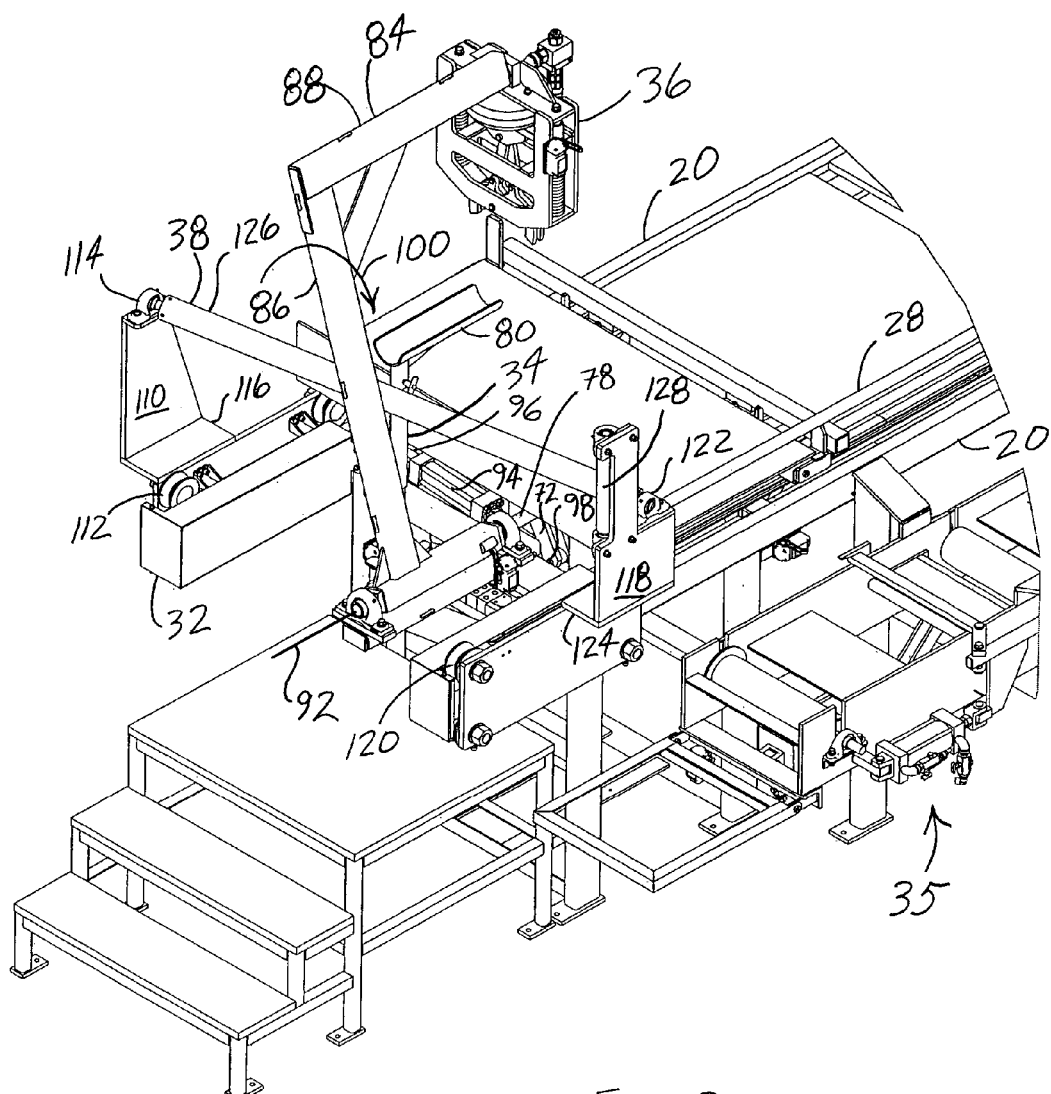
FIG. 8 is a partial perspective view of a gripper and a separator of the present invention.
Figure 9:
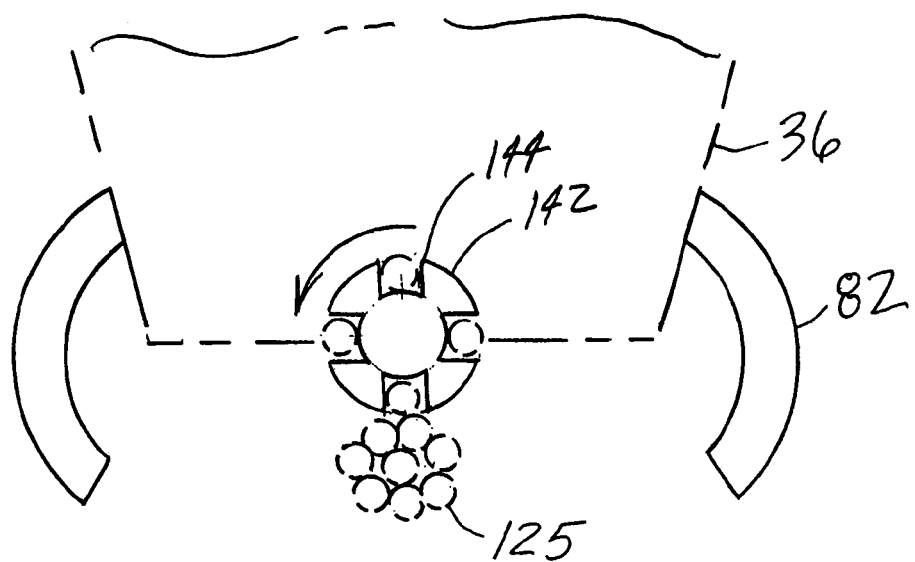
FIG. 9 is an enlarged partial elevation view of one embodiment of the gripper of the present invention.
Figure 10:
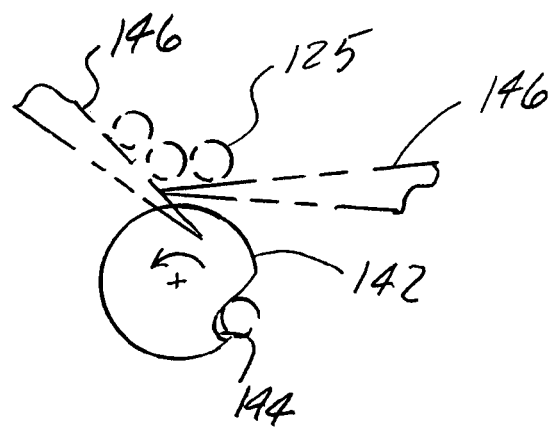
FIG. 10 is an enlarged partial elevation view of a further embodiment of the gripper of the present invention.
Figure 12:
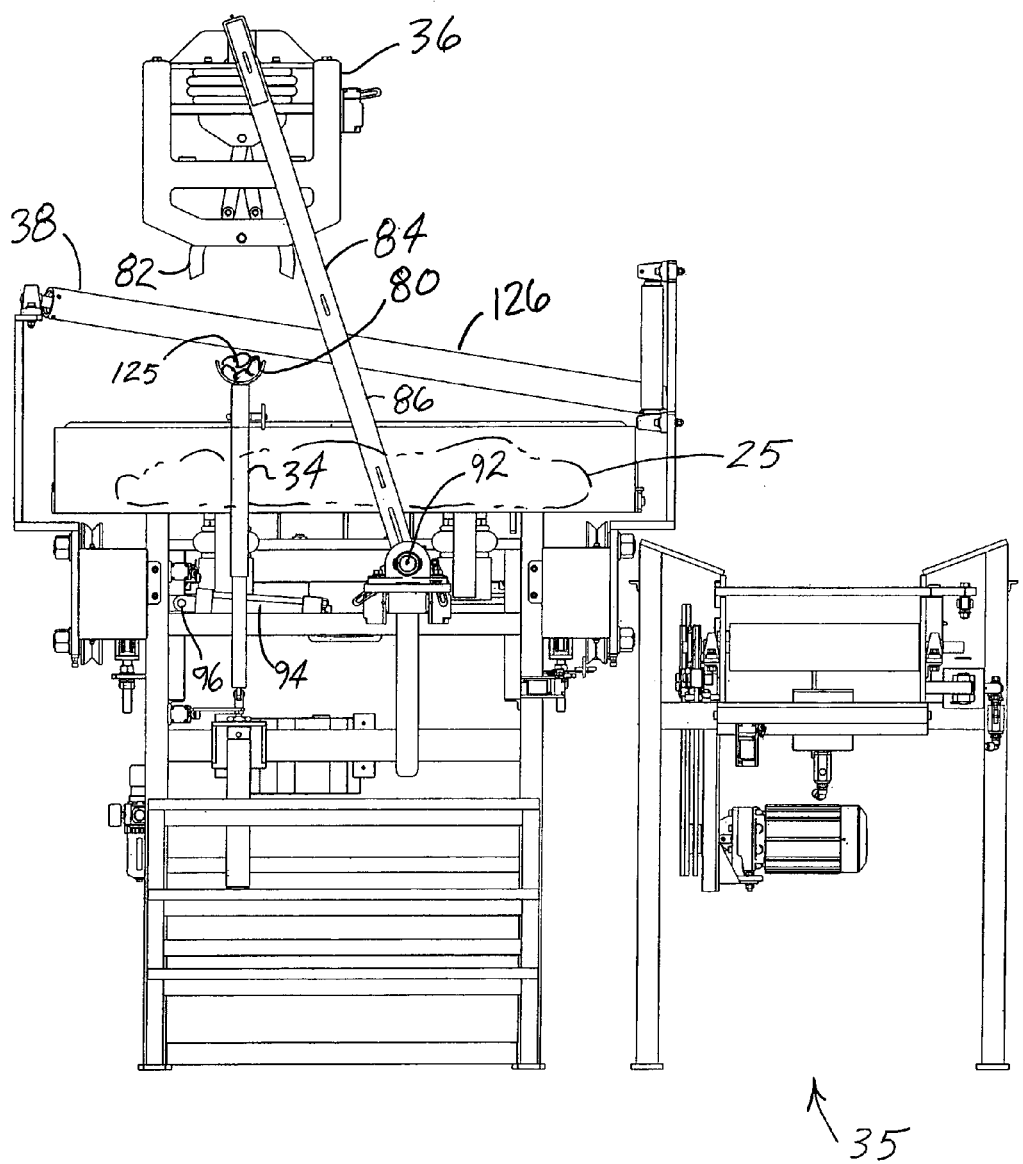
FIGS. 12–20 show sequential steps of operation of the profiled element separating machine of the present invention.
Figure 13:
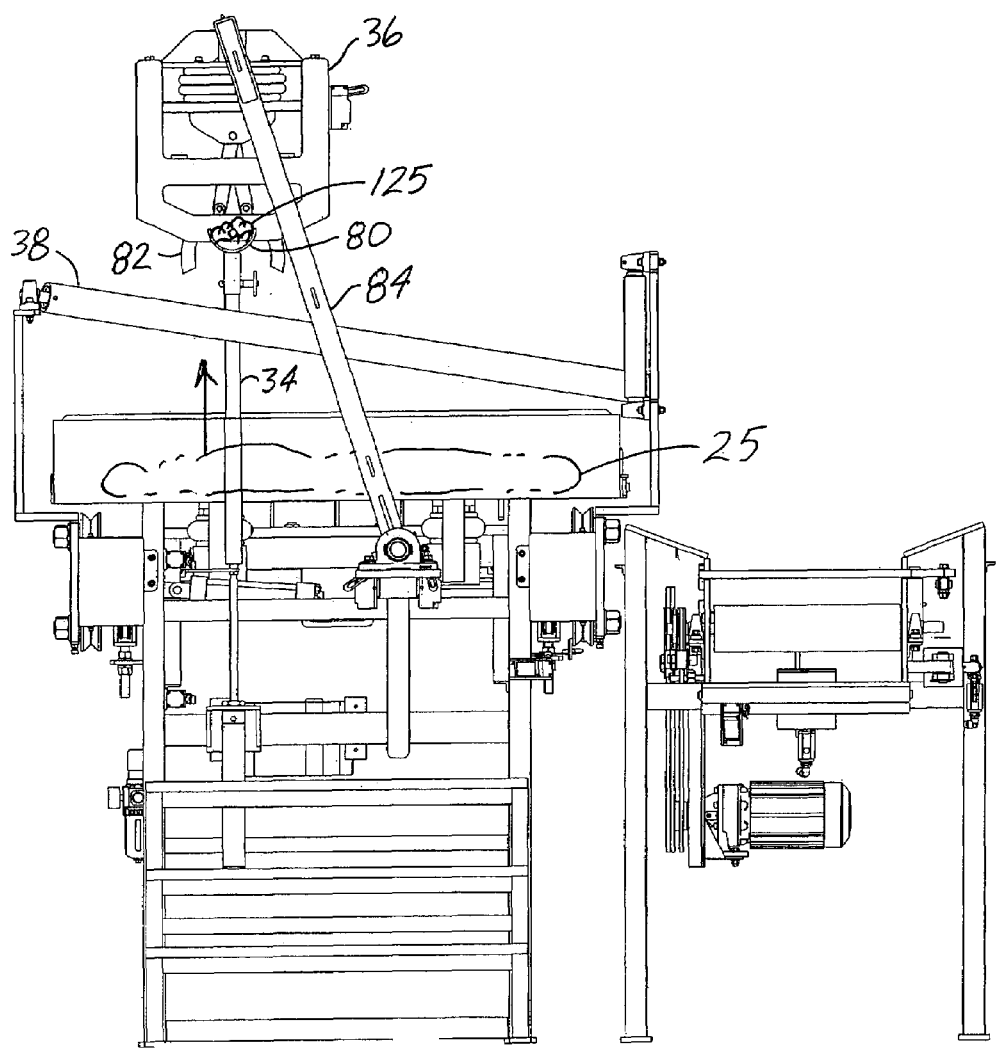
Figure 14:
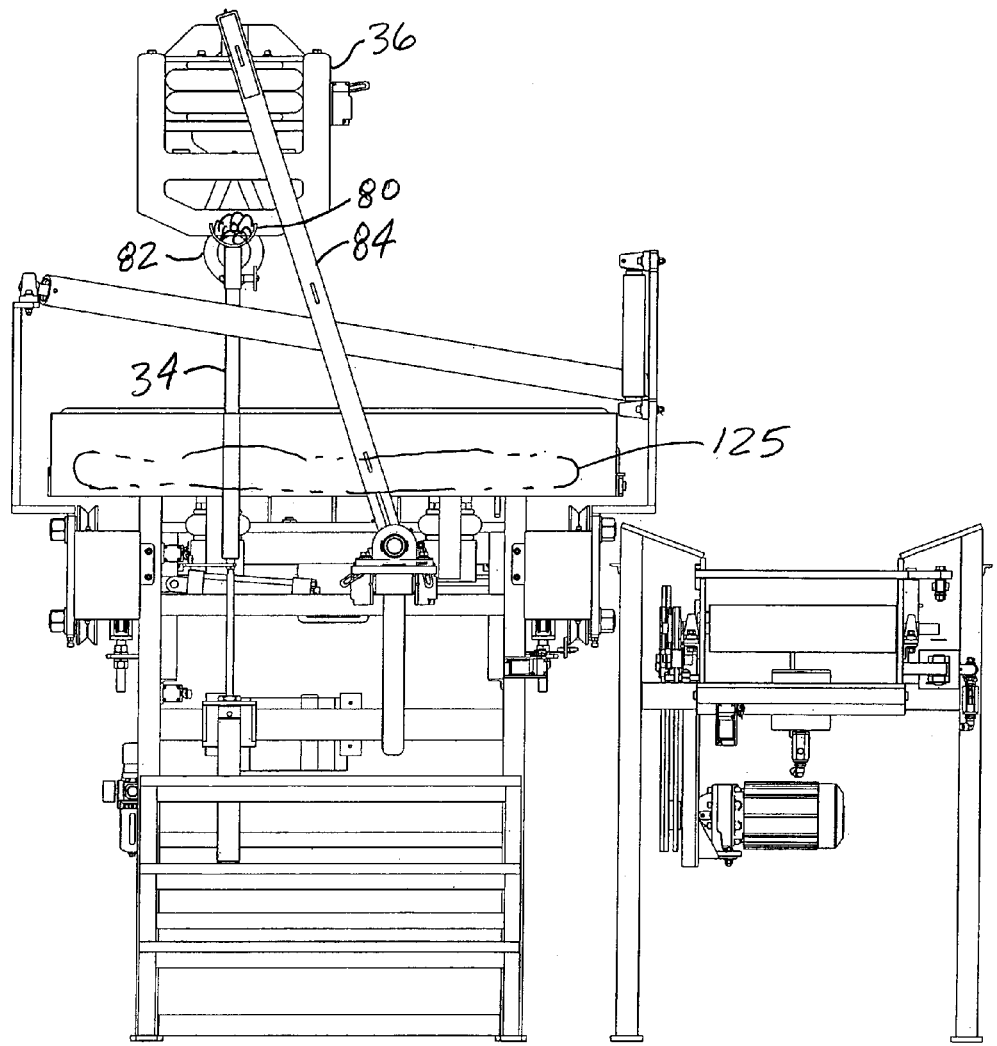
Figure 15:
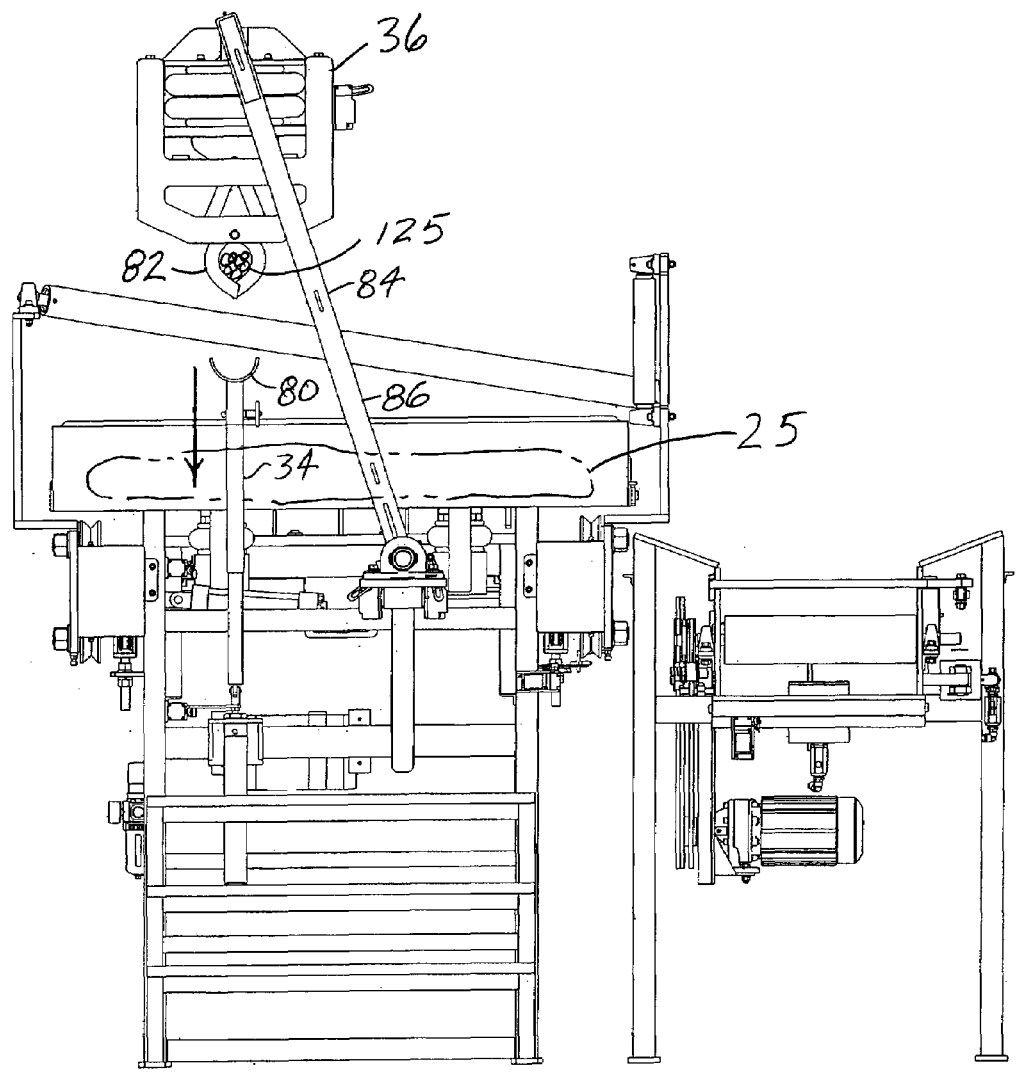

Referring to FIGS. 8–10, the gripper 36, separating device 38 and displacement member 34 that are disposed adjacent to the end 32 of the machine 10 and which collectively operate to separate selected profiled elements 125 from the plurality of profiled elements 25 are shown. In one embodiment, the displacement member 34 has an upwardly directed channel or cupped end 80 or trough that is actuated vertically to displace a portion of a number of profiled elements 125 from the plurality of profiled elements 25. The cupped end 80 can have any number of geometric profiles so long as the cupped end 80 can receive and retain profiled elements placed therein. When the displacement member 34 is in a retracted position, the cupped end 80 is disposed at a vertical position that is below a bar 126 (see FIG. 12) of the separating device 38. In one embodiment, ends of a plurality of profiled elements 125 are manually placed in the cupped end 80. Once the profiled elements 125 are placed in the cupped end 80, the displacement member 34 is substantially vertically actuated to an extended position so that a portion of the profiled elements 125 that are displaced and further separated from the bundle of profiled elements 25 is disposed adjacent the gripper 36. That is, a portion of the profiled elements, and preferably the ends of the profiled elements 125 are sufficiently raised to be received by the gripper 36. In one embodiment, the gripper 36 includes an opposed pair of jaws 82 that receive the ends of the profiled elements 125 when the jaws 82 are in an open position, and secures the ends of the profiled elements 125 when the jaws 82 are in a closed position. In an alternate embodiment, the gripper 36 includes a disk 142 having a predetermined number of slots 144 formed along the periphery of the disk 142 to receive profiled elements 125 that have been separated from the bundle of profiled elements 25 by the displacement member 34. Once the separated profiled elements 125 are brought adjacent to the disk 142, the disk 142 can be controllably rotated to selectably receive the desired number of profiled elements 125. In another embodiment, the disk 142 can include a single slot 144 or peripheral recess for receiving profiled elements 125, the disk 142 rotating to direct profiled elements one at a time past a retaining device 146 until the desired amount of profiled elements have been collected.

It is to be understood that the operation of the separating device can be an automated operation, wherein the retracted position of the actuator 34 having the cupped end 80 can be disposed below the frame height 62 of the horizontal members of the structure 12. Upon the actuator being actuated to an extended position, the cupped member 80 is raised to a vertical position that is above the frame height 62 at which the profiled elements 25 are supported by the structure 12. As the cupped end 80 is raised substantially vertically above the height of the profiled elements 25, the cupped end 80 collects and raised the portion of the profiled elements that are disposed within the footprint of the cupped end 80. These raised profiled elements 125 are separated from the bundle of profiled elements 25. It is to be understood that the displacement member 34 can be driven to actuate by virtue of a screw drive, pneumatics, hydraulics or other known construction.

It is to be understood that the gripper 36 does not require jaws and could be of any known construction, so long as the gripper 36 sufficiently secures the collected profiled elements therein during subsequent movement of gripper 36 and the separating device 38. It is also to be understood that the separating device 38 can displace the profiled elements 25 in any direction toward the gripper 36.

The gripper 36 is preferably supported by a frame 84 that includes a base 86 which is pivotally connected at a lower portion 90 to the structure 12 to rotate the base 86 about an axis 92 that is substantially transverse to the ends 32, 40 of the structure 12. Opposite the lower portion 90, the base 86 extends to an arm 88 that secures the gripper 36 thereto. An actuator 94 is pivotally connected to the structure 12 at one end 96, and pivotally connected to one end of a crank 72 at its other end 98. The opposite end of the crank 72 is connected to an axle 78 having the axis 92. When the end 98 of the actuator 94 is actuated so that the end 98 is directed toward the end 96, the frame 84 and gripper 36 is rotated about the axis 92 to substantially transversely move the gripper 36 toward the side of the structure 12 adjacent the movable retainer 28. Preferably, the actuator 94 and frame 84 are sized so that the gripper 36 is transversely moved outside the "footprint" of the structure 12. Stated another way, by pivoting the frame 84 about axis 92, the gripper 36 is moved transversely past or outward from the horizontal beam 20 of the structure 12, so that if the gripper 36 were to drop the end of the profiled element 125, the end of the profiled element 125 would fall to the floor adjacent to the structure 12, and preferably onto the chute 35. It is to be understood that the frame 84 can be constructed so that the gripper 36 does not trace a path that is transverse to the length of the structure 12 so long as the final position of the gripper 36 is outward from the horizontal beam 20 of the structure 12.

It is to be understood that there is no requirement that the gripper 36 secures the ends of the separated profiled elements 125. That is, the gripper 36 can be secured to a portion of the separated profiled element 125 that is not considered adjacent the ends of the separated profiled elements 125, so long as the separating device 38 can travel between the separated profiled elements 125 as secured by the gripper 36 and the remaining profiled elements 25.

The separating device 38 includes an arm 110 that extends to an inwardly directed joggle 116 having an end 112 which is movably supported by beam 20, the end 112 being configured to smoothly travel along the beam 20, such as by rollers. An opposite end 114 of arm 110 pivotally supports one end of a bar 126. An opposed arm 118 extends to an inwardly directed joggle 124 having an end 120 which is movably supported by beam 20, the end 120 being configured to smoothly travel along the beam 20, such as by rollers. An opposite end 122 of arm 118 pivotally supports the other end of the bar 126. In other words, bar 126 can rotate about its length supported by ends 114, 122 of respective arms 110, 118. By virtue of the joggles 116, 124 in respective arms 110, 118, the bar 126 necessarily being of sufficient length to span the width of the structure 12 to effectively separate profiled elements 125 from the profiled elements 25 supported by the structure 12. Preferably, end 114 of the arm 110 is disposed at a higher vertical position than end 122 of the arm 118 so that the bar 126 is sloped to urge the separated profiled elements 125 toward end 122 by force of gravity. A substantially vertical retainer 128 is disposed adjacent the end 122 to prevent the separated profiled elements 125 from sliding over both the bar 126 and the end 122 as the separating device 38 is directed to move from the end 32 toward the end 40 of the structure 12 as will be discussed in further detail below.

Figure 11:
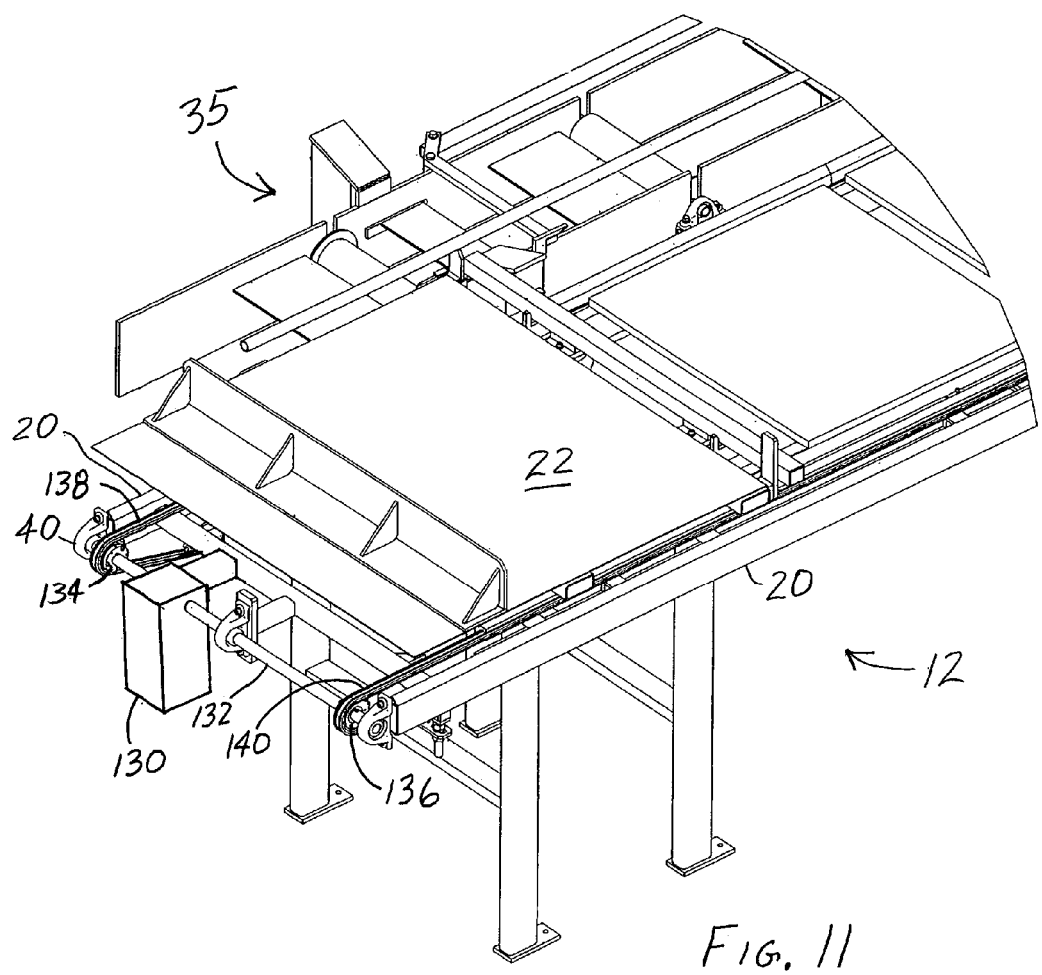
FIG. 11 is a partial perspective view of a drive system for the separator of the present invention.

As shown in FIG. 11, the separator 38 is preferably driven to move along the beams 20 by a motor 130. The motor 130, which is preferably disposed adjacent end 40 of the structure 12 and secured to the structure 12, rotatably drives an axle 132. Preferably, a pair of gears 134, 136 is secured to the axle 132 to drive respective belts 138, 140 that each extend along one beam 20. End 112 of arm 110 is connected to belt 140 and end 120 of arm 118 is connected to belt 138 to synchronously move the ends of the separating device 38 between the ends 32, 40 of the structure 12. It is appreciated by those skilled in the art that the separating device 38 can be moved along the beams 20 of the structure 12 by a screw drive, pneumatics, hydraulics or other known construction.

Figure 16:
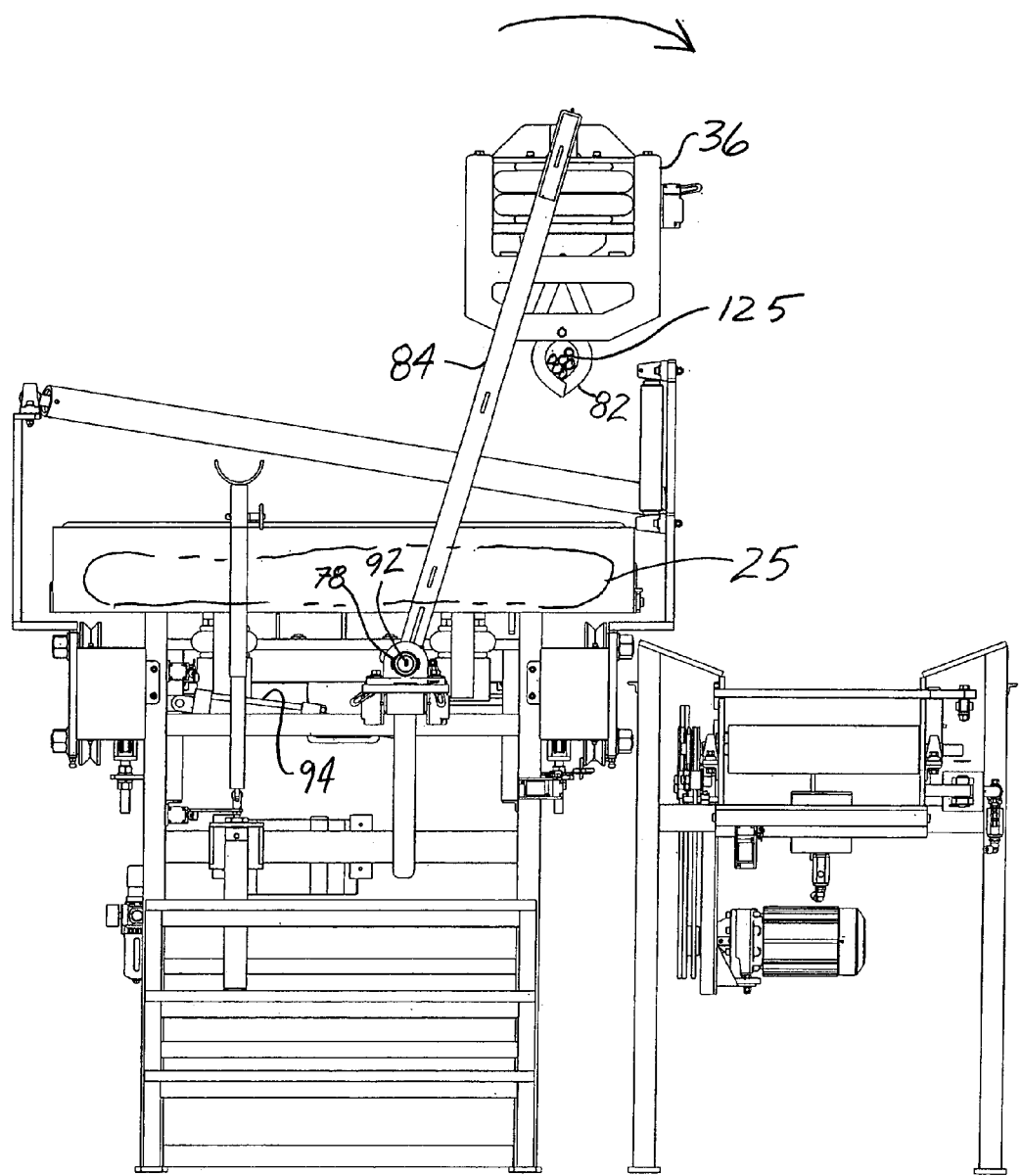
Figure 17:
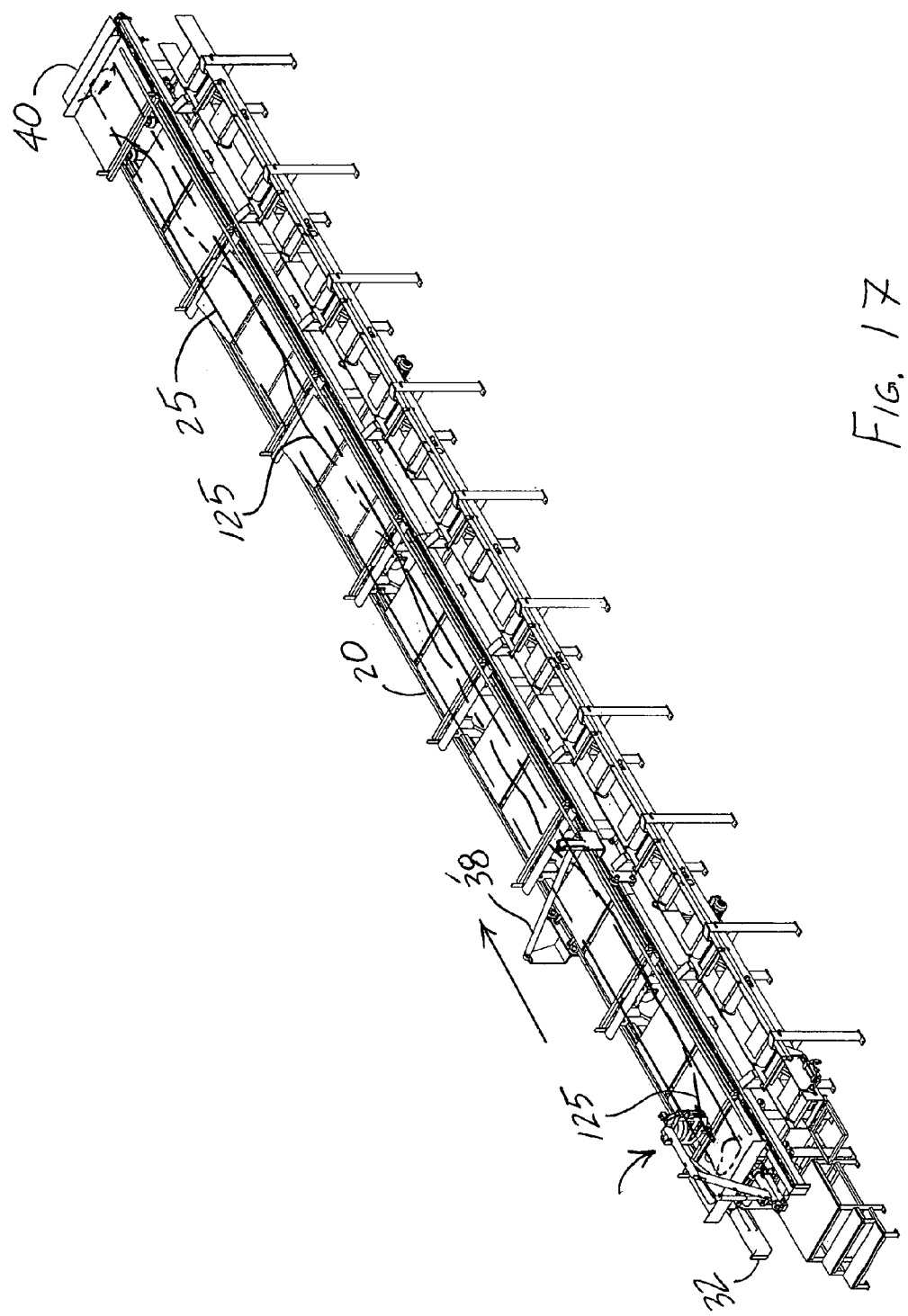

Referring to FIGS. 12–20, the operation of an embodiment of the machine 10 of the present invention is now described. Once the profiled elements 25 are placed onto the structure 12 and profiled elements 125 from the profiled elements 125 are placed in the cupped end 80 (FIG. 12), the displacement member 34 is actuated in a substantially vertical direction so that the cupped end 80 separates a portion of the separated profiled elements 125 from the remaining profiled elements 25, as previously discussed. The separated profiled elements 125 are raised adjacent to the gripper 36 (FIG. 13) to permit the gripper 36 to secure a predetermined number of the separated profiled elements 125. Preferably, the gripper 36 does not need to move, although in an alternate embodiment, the gripper 36 can be configured to move adjacent to the separated profiled elements 125. For example, the gripper 36 may employ a chain to form a loop (not shown) to secure the separated profiled elements 125, which could require that the gripper 36 be slid over the end of the separated profiled elements 125. Once the gripper 36 has secured the predetermined number of separated profiled elements 125 (FIG. 14), the displacement member 34 is returned to its retracted position (FIG. 15), separating the cupped end 80 from the separated profiled elements 125, and the separating device 38 begins to travel along the beams 20 by the belt-drive arrangement of motor 130 as previously discussed and as shown in FIG. 17. As the separating device 38 travels along the beams 20 from end 32 toward end 40, the separating device 38 separates the profiled elements 125 from the bundle of profiled elements 25 supported by the structure 12.

Figure 18:
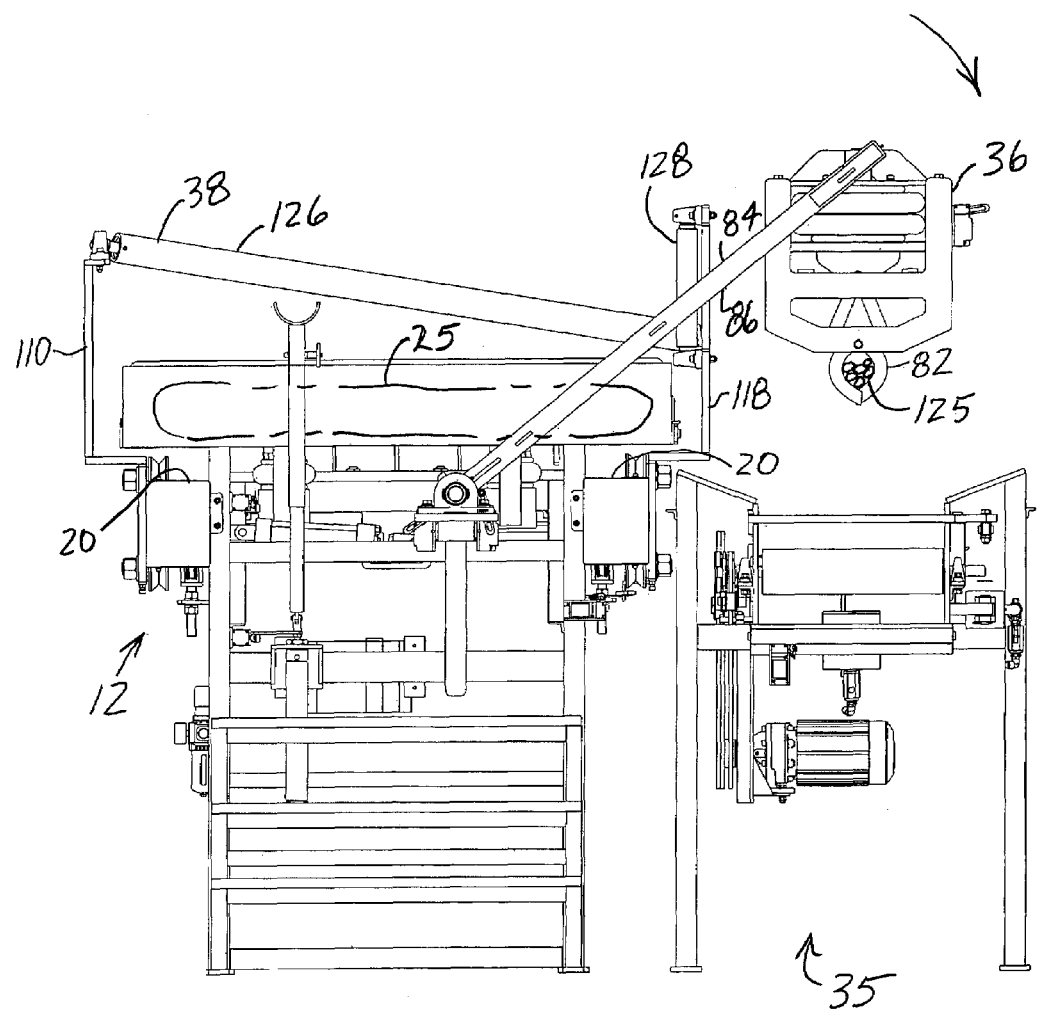

As shown in FIGS. 16 and 18, the actuator 94 actuates in a direction to drive the frame 84 to rotate about axis 92 as previously discussed to move the gripper 36 in a direction substantially transverse to the length of the structure 12 so that the gripper 36 transversely extends past the beam 20 adjacent the movable retainer 28. It is to be understood that the order of operations of the machine 10 described and shown in FIGS. 16 and 17 can occur simultaneously, or can be reversed.

Figure 19:
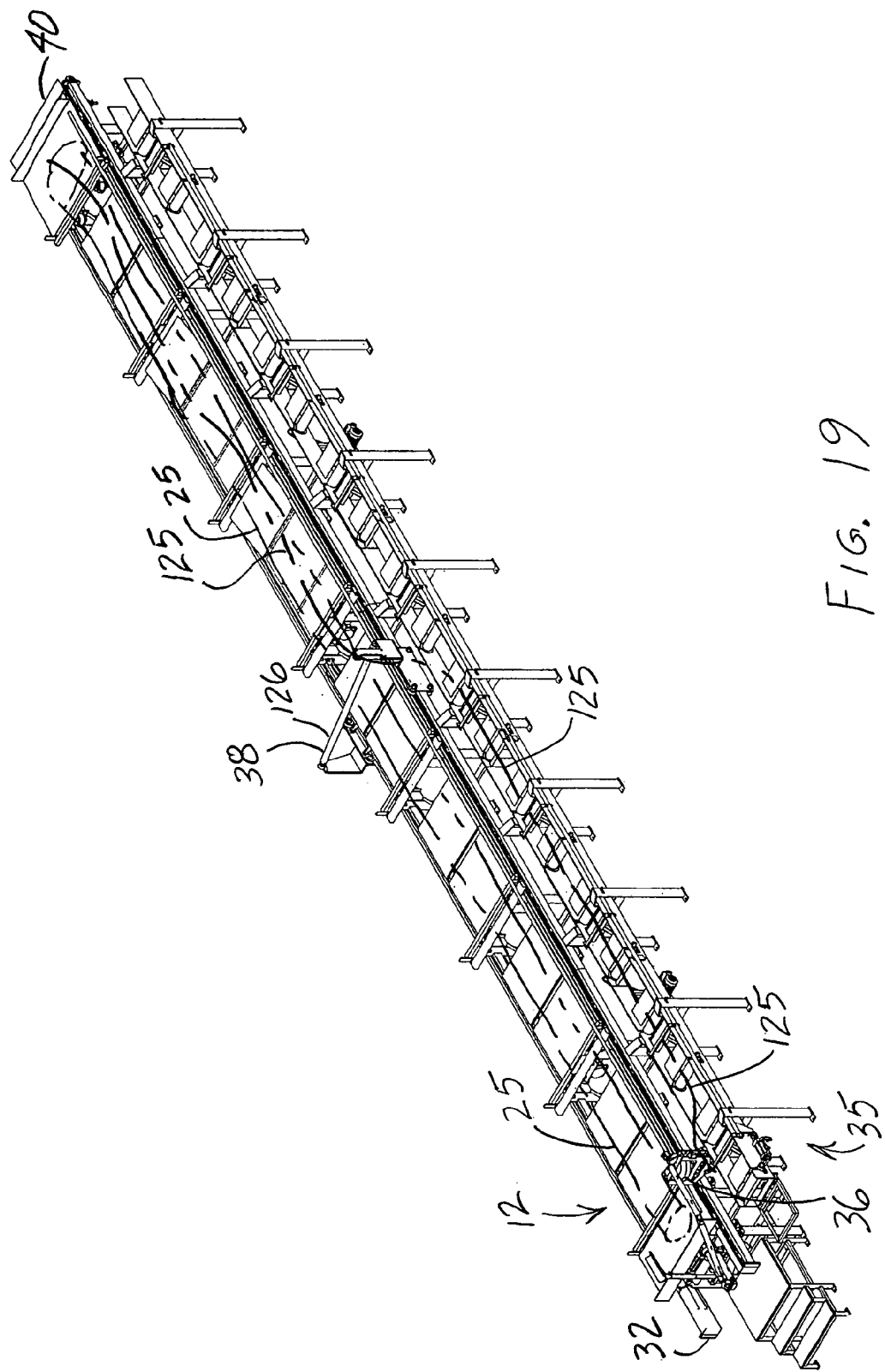
Figure 20:
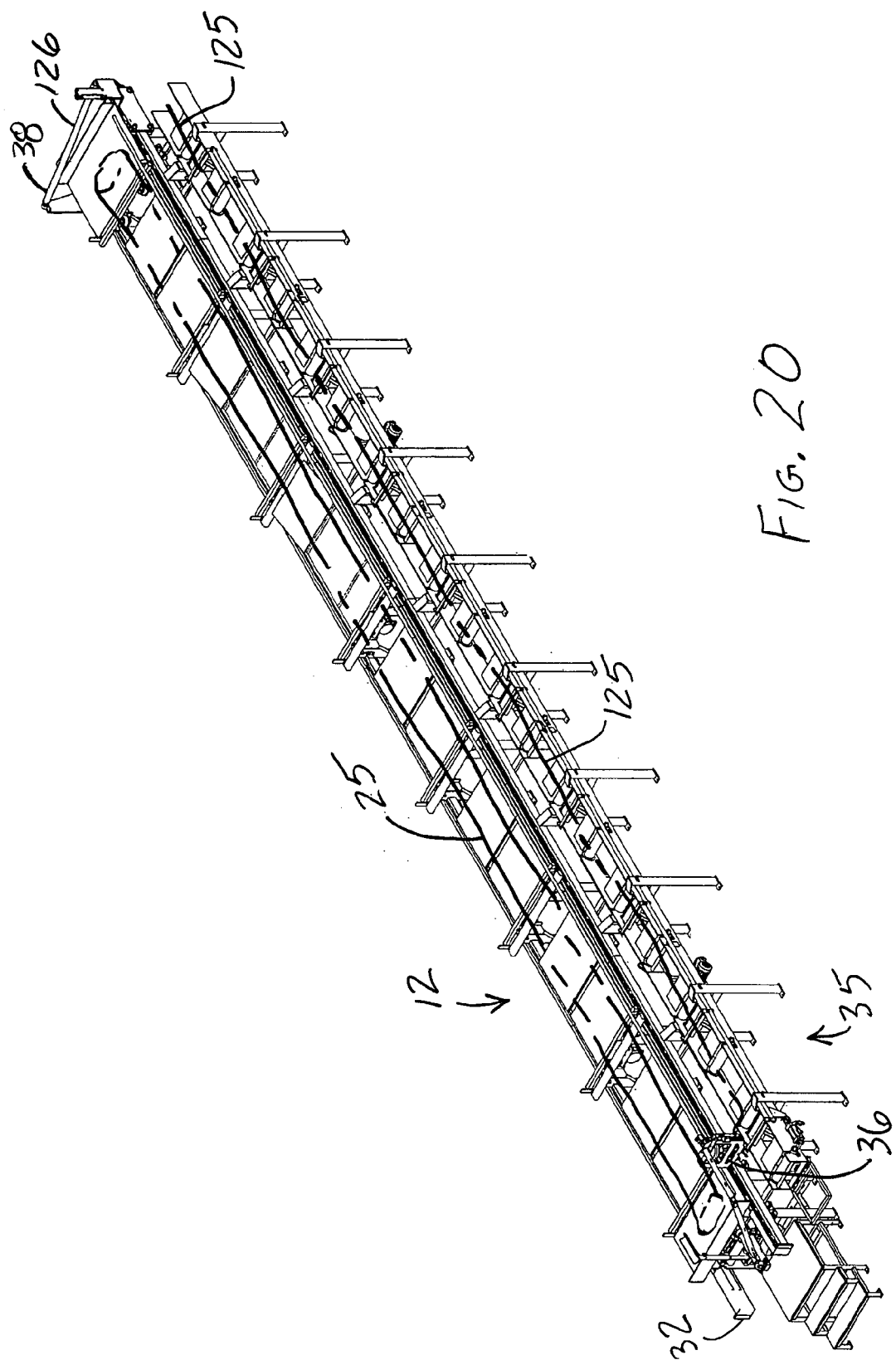

Referring to FIGS. 19–20, the separating device 38 continues to travel along the beams 20, separating the profiled elements 125 from the remaining profiled elements 25. In addition to separating the profiled elements 125 from the remaining profiled elements 25, the sloped bar 126 of the separating device 38 directs the profiled elements 125 toward the arm 118 of the separating device 38 by force of gravity and rolling contact between the bar 126 and the profiled elements 125. As the separating device 38 continues to travel along the beams 20 toward end 40, the portion of the separated profiled elements 125 between the gripper 36 and the separating device 38 have been transversely moved outside the footprint of the structure 12, for collection in the adjacent chute 35. It is appreciated that as the separating device 38 approaches the end 40 of the structure 12, once the separating device 38 travels past the opposite end of the profiled elements 25, completely separating the profiled elements 125 from the profiled elements 25, the ends of the profiled elements 125 adjacent the end 40 are urged to align with the remainder of the profiled elements 125 that are supported by the adjacent chute 35. In other words, once a sufficient portion of the profiled elements 125 are moved to the adjacent chute 35, the weight of the portion of the profiled elements 125 in the adjacent chute 35 then acts to help move the subsequent portions of the separated profiled elements 125 to the adjacent chute 35 without requiring additional actions. Upon reaching the end 40, the separating device 38 is then returned toward the end 32 of the structure 12 and the gripper 36 is rotated to its previous position and the procedure repeated.

The machine 10 of the present invention can significantly increase the speed at which profiled element separation is performed while reducing both the amount of labor required and the type of labor required. In other words, if a worker is required to operate the machine 10, the worker may be required to place the ends of profiled elements in the cupped end 80 of the displacement member 34 versus strenuous, repetitive movements formerly required to separate profiled elements. Since profile element separation is no longer the bottleneck in the process, it may be possible to combine production lines, such as previously separately maintained production lines for processing larger sized profiled elements.

In an alternate embodiment (not shown), an additional gripper 36 and separating device(s) 34 can be disposed adjacent to the end 40 so that the separating device 34 can provide separated profiled elements 125 as the separating device 34 travels in each direction between ends 32, 40 of the structure 12.

In a yet further alternate embodiment (not shown), the width of the structure 12 can be significantly increased to accommodate the placement of multiple bundles, such as two or more, of profiled elements including bundles of profiled elements of different sizes. Preferably, one displacement member 34 is associated with each bundle of profiled elements. One gripper 36 is preferably configured to receive displaced profiled elements as previously discussed, although the gripper 36 can receive a mixture of profiled elements of different sizes. Further, unlike the embodiment in FIG. 8, the frame 84 supporting the gripper 36 is not confined to rotational movement 100 about the axis 92, and can include a device, such as a slide, to move the frame 84 along a path that is substantially transverse to the length of the structure 12. Alternately, or additionally to the transverse movement, the frame 84 can include a telescoping feature that selectively increases or decreases the length of the base 86 so that the gripper 36 can be positioned outside of the footprint of the structure 12 as previously discussed. Similarly, the telescoping feature can include the ability to selectively increase or decrease the length of the arm 88 or move the frame 84 in a direction that is substantially parallel to the length of the structure 12.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A machine for separating at least one profiled element from a plurality of profiled elements, the machine comprising:
   a structure having a first end, a second end opposite the first end and a first side opposite a second side, the structure being configured to receive a plurality of profiled elements extending between the first and second ends;
   a first separating device associated with the structure, the first separating device configured to distribute the plurality of profiled elements between the first and second sides;
   a displacement member for displacing a portion of at least one profiled element of the plurality of profiled elements away from a remainder of the plurality of profiled elements, the displaced portion of the at least one profiled element of the plurality of profiled elements being adjacent the first end;
   a gripper disposed adjacent the first end and configured to securely receive the displaced portion of the at least one profiled element of the plurality of profiled elements, the gripper being configured to move the displaced portion of the at least one profiled element of the plurality of profiled elements toward one of the first and second sides; and
   a second separating device disposed adjacent the first end between the displaced portion of the at least one profiled element of the plurality of profiled elements and the remainder of the plurality of profiled elements, the second separating device traveling from the first end toward the second end to separate the at least one profiled element of the plurality of profiled elements from the remainder of the plurality of profiled elements and directing the at least one profiled element of the plurality of profiled elements to one of the first side and the second side of the structure.

2. The machine of claim 1 wherein the first separating device comprises at least one pair of chains disposed both substantially transverse to and between the first and second ends, the at least one pair of chains being driven in opposite directions to distribute the plurality of profiled elements between the first and second sides.

3. The machine of claim 2 wherein the at least one pair of chains evacuates the remainder of the plurality of profiled elements from the structure, each of the at least one pair of chains being driven to movement in the same direction to move the remainder of the plurality of profiled elements toward one of the first and second sides.

4. The machine of claim 1 wherein the first separating device comprises an eccentric motor secured to a first member disposed between the first and second ends, the eccentric motor configured to transmit vibrational energy from the eccentric motor through the first member to the plurality of profiled elements to distribute the plurality of profiled elements between the first and second sides.

5. The machine of claim 4 wherein the first member is substantially transverse to the first and second ends.

6. The machine of claim 4 wherein the first member is vibrationally isolated from the remainder of the structure.

7. The machine of claim 6 wherein the vibrational isolation is provided by at least one air pillow.

8. The machine of claim 1 wherein the displacement member comprises an actuator extending to a cupped end, the cupped end to receive the portion of at least one profiled element of the plurality of profiled elements.

9. The machine of claim 8 wherein the portion of at least one profiled element of the plurality of profiled elements is manually placed in the cupped end, the actuator actuating the cupped end toward the gripper.

10. The machine of claim 1 wherein the gripper is configured to receive a predetermined number of the at least one profiled element of the plurality of profiled elements.

11. The machine of claim 1 wherein the gripper is configured to move the displaced portion of the at least one profiled element of the plurality of profiled elements outside a footprint of the structure past one of the first and second sides.

12. The machine of claim 11 wherein the second separating device directs the at least one profiled element of the plurality of profiled elements outside the footprint of the structure past one of the first and second sides.

13. The machine of claim 1 wherein the second separating device comprises a first arm adjacent the first side and a second arm adjacent the second side, a bar rotatably connected to each of the first and second arms, the bar having a slope to direct the at least one profiled element of the plurality of profiled elements to one of the first side and the second side of the structure.

14. The machine of claim 13 wherein the second separating device farther comprises a retainer rotatably secured adjacent one of the first and second arm.

15. The machine of claim 1 further comprising a second gripper disposed adjacent the second end.

16. The machine of claim 15 farther comprising a second displacement member adjacent the second gripper.

17. A machine for separating at least one profiled element from a plurality of profiled elements, the machine comprising:
a structure having a first end, a second end opposite the first end and a first side opposite the second side, the structure being configured to receive a plurality of profiled elements extending between the first and second ends;
a first separating device associated with the structure, the first separating device configured to distribute the plurality of profiled elements between the first and second sides;
an actuating member for raising one end of at least one profiled element of the plurality of profiled elements above a remainder of the plurality of profiled elements, the raised end of the at least one profiled element of the plurality of profiled elements being adjacent the first end;
a gripper disposed adjacent the first end and configured to securely receive the raised end of the at least one profiled element of the plurality of profiled elements, the gripper pivoting the raised end of the at least one profiled element toward one of the first and second side; and
a second separating device disposed adjacent the first end between the raised end of the at least one profiled element and the remainder of the plurality of profiled elements, the second separating device traveling from the first end toward the second end to separate the at least one profiled element of the plurality of profiled elements from the remainder of the plurality of profiled elements and directing the at least one profiled element of the plurality of profiled elements to one of the first side and the second side of the structure.

* * * * *